Jan. 3, 1950 S. E. MILLER 2,493,011

OSCILLATOR POWER OUTPUT MAXIMIZING SYSTEM

Filed Oct. 8, 1947 2 Sheets-Sheet 1

INVENTOR
S.E. MILLER
BY
Franklin Mohr
ATTORNEY

Jan. 3, 1950 S. E. MILLER 2,493,011

OSCILLATOR POWER OUTPUT MAXIMIZING SYSTEM

Filed Oct. 8, 1947 2 Sheets-Sheet 2

INVENTOR
S.E. MILLER
BY
Franklin Mohr
ATTORNEY

Patented Jan. 3, 1950 2,493,011

UNITED STATES PATENT OFFICE 2,493,011

OSCILLATOR POWER OUTPUT MAXIMIZING SYSTEM

Stewart E. Miller, Jackson Heights, N. Y., assignor to Bell Telephone Laboratories, Incorporated, New York, N. Y., a corporation of New York Application October 8, 1947, Serial No. 778,627

5 Claims. (Cl. 250—36)

This invention relates to a system for holding the power output of an oscillator or amplifier automatically at a maximum value and is particularly applicable to an oscillator of a type in which the power output has a maximum value at an intermediate point in the voltage range of a potential upon one of the electrodes of the oscillator.

Electron velocity variation oscillators including reflex oscillators and magnetrons are examples of oscillators to which the invention is applicable. In the case of the reflex oscillator, the power output goes through a maximum value at a definite optimum voltage of the repeller electrode. In the case of the magnetron, the power output is a maximum for a particular value of the potential difference between the anode and the cathode.

In accordance with the invention, a small alternating potential is impressed upon the control electrode of a space discharge device to be controlled, for example the repeller electrode of a reflex oscillator, causing the power output to fluctuate continuously within narrow limits. The power fluctuations of the oscillator may advantageously be amplified and are then impressed upon a detector together with an alternating current of steady amplitude having a definite phase relation to the alternating current which is impressed upon the control electrode to produce the power variations. The amplitude of the response produced by the detector is dependent upon the phase relationship between the two alternating current components which are superimposed upon the detector, and for that reason the detector is referred to as being phase sensitive. On one side of the optimum control electrode potential, the two alternating current components are in aiding phase relationship while on the other side of the optimum point the two components are in phase opposition. The detected current is impressed upon the control electrode in such polarity as to tend to restore the system to maximum amplitude of oscillation whichever way the control electrode potential may vary from the optimum point.

The invention is more fully described hereinafter in conjunction with the accompanying drawings, while the scope of the invention is defined in the appended claims.

Figures 1, 2:
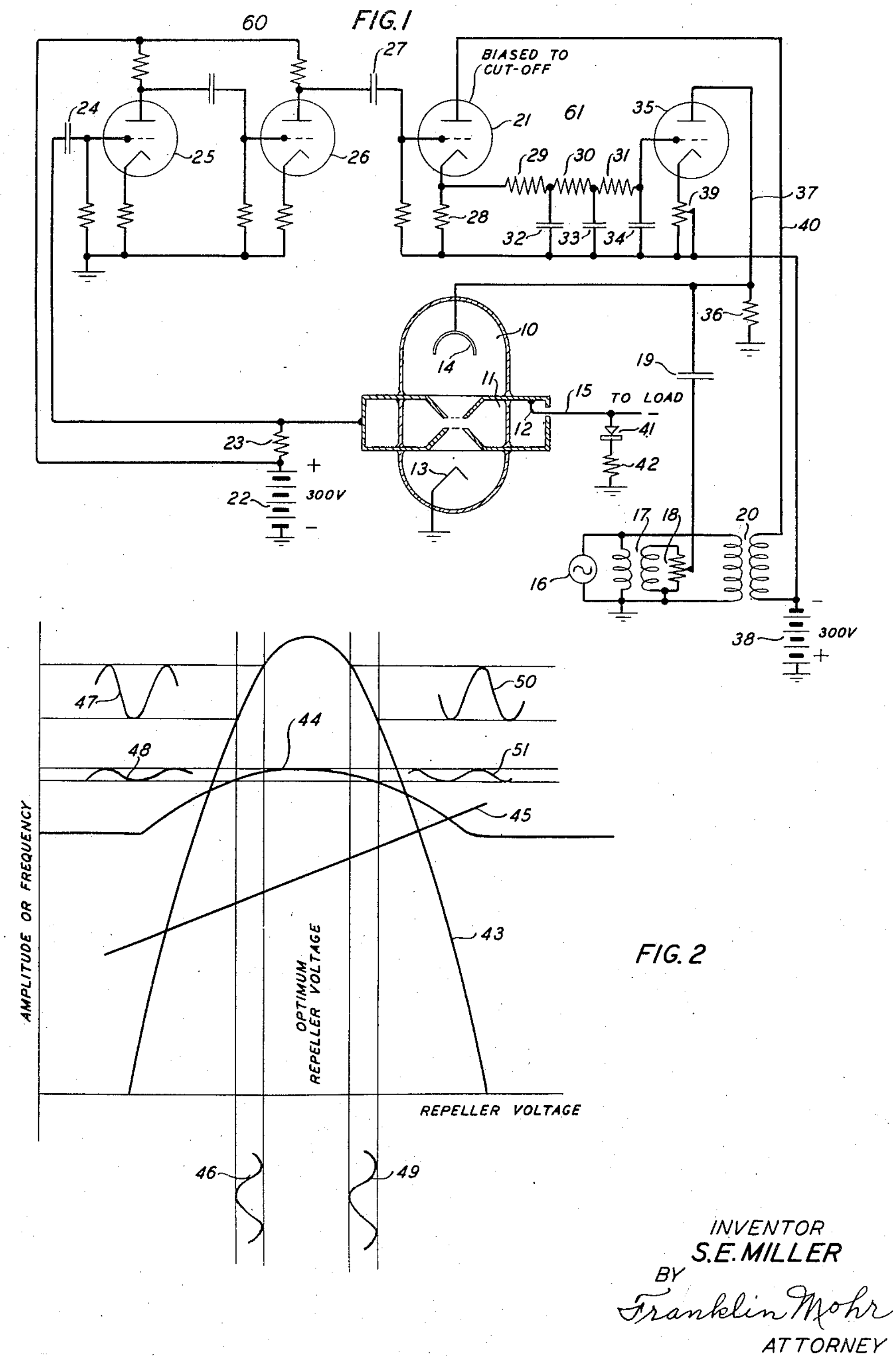
Figure 3:
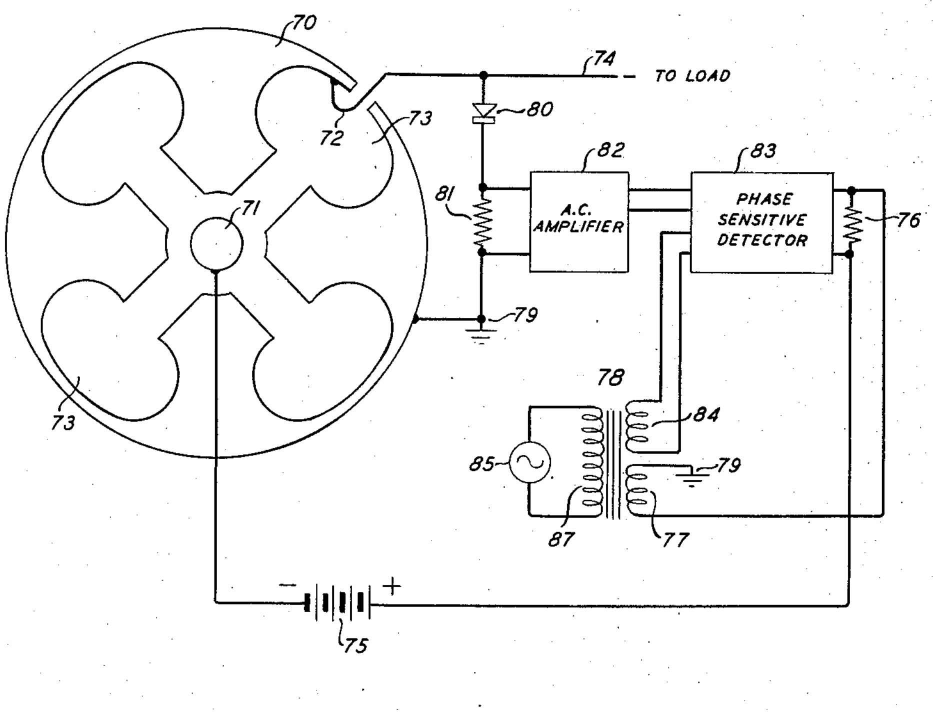

In the drawings, Fig 1 is a schematic circuit diagram of an embodiment of the invention as applied to a reflex oscillator of the electron velocity variation type. Fig. 2 is a diagram useful in explaining the operation of the invention and Fig. 3 is a circuit schematic diagram of an embodiment of the invention as applied to a magnetron.

Referring to Fig. 1, there is shown therein a reflex oscillator 10 comprising a space discharge device including a cavity resonator 11, an output coupling loop 12 therein, a cathode 13 and a repeller electrode 14. The output coupling loop is connected to any suitable load through a lead 15. A relatively low frequency source 16, such as a 60-cycle generator or power line, is shown supplying two separate circuits each of which advantageously includes a transformer. One such transformer 17 supplies a relatively low potential output through a potentiometer 18 and a condenser 19 to the repeller electrode 14. A second transformer 20 supplies a relatively large alternating potential to the anode of a triode 21 which is biased to cut-off to operate as a detector. A battery 22 or other source of potential for accelerating electrons is connected in a circuit between the cavity resonator 11 and the cathode 13, the circuit including a resistor 23. The end of the resistor 23 remote from the battery 22 is connected through a condenser 24 to the grid of a triode 25 which triode together with a similar triode 26 comprises an alternating current amplifier 60 the output of which is connected through a condenser 27 to the control grid of the detector triode 21. A cathode resistor 28 is included in the cathode circuit of the tube 21 and across the resistor 28 is advantageously connected a low-pass filter 61 comprising series resistors 29, 30 and 31 and shunt capacitors 32, 33 and 34. The terminals of the capacitor 34 are connected across the grid cathode circuit of a direct current amplifier tube 35 in the anode circuit of which is an anode load resistor 36. The terminal of the resistor 36 adjacent to the anode of the tube 35 is connected through a lead 37 to the repeller 14 of the oscillator 10. A supply battery 38 is connected between the anode and cathode of the tube 35, in a circuit that includes a cathode rheostat 39 and the load resistor 36. A circuit for measuring the power output of the oscillator is provided, comprising a rectifier 41 and a resistor 42 connected in shunt to the load. A crystal rectifier is well suited for this purpose.

In the operation of the system of Fig. 1, the application of the battery 22 between the cavity resonator 11 and the cathode 13 together with the application of a suitable potential upon the control repeller 14 produces oscillations in the cavity resonator 11 in known manner, which oscillations may be supplied to any desired load through the coupling 12 and the lead 15. The low frequency current, for example 60 cycles, from the generator 16, impressed upon the repeller electrode 14 through the transformer 17, potentiometer 18 and condenser 19 causes a periodic slight fluctuation in the repeller voltage which in turn causes power fluctuations of small magnitude in the oscillations in the cavity resonator 11 and causes corresponding potential fluctuations in the resistor 23. The fluctuations of potential in the resistor 23 are impressed upon the alternating current amplifier 60 through the coupling condenser 24. An amplified replica of the fluctuations in the resistor 23 is impressed upon the grid of the detector 21 through the coupling condenser 27. Another component of the low frequency alternating current is impressed through the transformer 20 upon the anode of the detector 21 through the lead 40. The detected current passed by the tube 21 through the cathode resistor 28 thereof, is dependent upon the phase relationship between the alternating current components impressed upon the grid and anode respectively. Maximum detected current is obtained when the grid and anode components are in the same phase and minimum is obtained when these two components are directly opposed in phase. The current obtained in the cathode resistor 28 is filtered in the low-pass filter 61 comprising the elements 29 to 34 inclusive, resulting in a relatively steady potential being maintained upon the capacitor 34 at the far end of the filter. The potential across the capacitor 34 is employed to control the potential across the anode resistor 36 through the tube 35 to impress a direct current component upon the repeller electrode 14 through the lead 37. The amplitude of the direct current in resistor 36 is conveniently adjustable by varying the rheostat 39.

The control action of the system of Fig. 1 may be explained with reference to Fig. 2 which is a diagram showing various quantities associated with the oscillator 10 and their variation as a function of the voltage upon the repeller electrode 14. The abscissae in Fig. 2 are values of repeller voltage and the ordinates are amplitudes of certain currents in the system or the frequency of the system as the case may be. The curve 43 represents the current in the rectifier 41 as a function of the voltage on the repeller electrode 14. The curve 44 represents the current through the resistor 23 between the cavity resonator 11 and the cathode 13. The curve 45 represents the variation of the frequensy of the oscillator 10 with change of repeller voltage. The curve 46 represents the low frequency alternating wave impressed upon the repeller electrode 14 from the potentiometer 18 assuming that the repeller voltage is on the left-hand side of the optimum repeller voltage as indicated in Fig. 2. Curve 47 shows the resulting fluctuations in the crystal current in response to the alternations shown in the curve 46 and the curve 48 shows the corresponding variations in the current from the cavity resonator to the cathode. It will be noted that when the fluctuation of the curve 46 is toward the right, the curves 47 and 48 are each in the upper portion of its cycle of variation while when the curve 46 goes to the left, the curves 47 and 48 go through the lower portion of their cycles. The curve 49 represents the same applied alternating current as represented by the curve 46 except that it shows the case in which the repeller voltage is on the right-hand side of the optimum repeller voltage value. Corresponding to the curve 49 the curve 50 represents the resultant variation in the crystal current and the curve 51 represents the resulting variation in the cavity resonator to cathode current. It will be noted that when the curve 49 goes to the right, the curves 50 and 51 go through the lower portion of their cycles and when the curve 49 goes to the left the curves 50 and 51 go through the upper portion of their cycles. Accordingly it is evident that the same phase of impressed alternating current, shown by either curve 46 or curve 49, produces one phase of alternating current or the direct opposite depending upon which side of the optimum repeller voltage the impressed alternating current voltage is applied. In the system of Fig. 1, the rectified current in the resistor 36 is of small amplitude when the alternating current on the repeller electrode 14 is operating on the side of the optimum repeller voltage for which the grid and anode alternations impressed upon the detector 21 are in opposite phase and the rectified current in the resistor 36 is relatively large when the repeller electrode voltage is on the other side of the optimum value, the grid and anode components then being in the same phase. It will be noted from Fig. 2 that the closer the repeller voltage approaches the optimum value, the smaller the variations produced in the curves 47, 48, 50 and 51 and hence the smaller the control voltage produced across the resistor 36. The polarities in the system of Fig. 1 are so arranged therefore that when the repeller voltage departs to one side or the other from the optimum value, the resulting detected current produces a change in the repeller voltage in such a direction as to tend to bring the repeller voltage back to the optimum value. No matter which side the departure is made, the correction is obtained, because as will be seen from Fig. 2 the system discriminates between departures to the right and to the left, the alternating current component being in one phase when the departure is to the left and in the opposite phase when the departure is to the right.

Unlike the usual automatic control system the arrangement of Fig. 1 does not function to maintain a constant output but does function to keep the output always at the maximum value. If it is desired to control the frequency of the system by some sort of frequency control, automatic or otherwise, this may be done by known means and with the system of Fig. 1 in operation, the power output will be maintained at a maximum regardless of variations in the frequency of the system.

Fig. 3 shows an embodiment of the invention in a system containing a magnetron, wherein 70 is the anode block shown in cross-section, 71 is the cathode also in cross-section, and 72 is an output coupling loop arranged in conventional manner in one of the cavity resonators 73 in the block 70. A lead 74 connected with the loop 72 is provided for extension to a load circuit of any desired form. A power supply source 75 shown as a battery for simplicity is connected with its negative terminal directly to the cathode 71 and its positive terminal to the anode block 70 through a control resistor 76, a winding 77 of a transformer 78 and ground 79, the anode block 70 being grounded. A shunt circuit comprising a rectifier 80 and a resistor 81 in series therewith is connected between the lead 74 and ground, thereby shunting the load of the magnetron. The terminals of the resistor 81 are connected to the input terminals of an alternating current amplifier 82, the output terminals of which are connected to one pair of input terminals of a phase sensitive detector 83. A second pair of input terminals of the detector 83 are connected across a winding 84 of the transformer 78. The detector 83 has a pair of output terminals that are connected across the control resistor 76. A low frequency alternating current source 85, which advantageously comprises a 60-cycle generator or power line is connected to a winding 87 of the transformer 78, which winding 87 constitutes a primary winding with respect to secondary windings 77 and 84.

In the operation of the system of Fig. 3, the application of the battery 75 between the anode block 70 and the cathode 71 of the magnetron together with a suitable potential impressed across the control resistor 76 by means of the phase sensitive detector 83 produces oscillations in the magnetron cavity resonators 73 in known manner, which oscillations are supplied to the load through the loop 72 and the lead 74. The low frequency current from the source 85, impressed between the anode 70 and the cathode 71 through the transformer 78, control resistor 76, and ground 79, causes a periodic slight fluctuation in the anode-cathode voltage of the magnetron which in turn causes power fluctuations in the loop 72, lead 74 and the shunt circuit 80, 81 at the same low frequency (60-cycle) rate. These power fluctuations are demodulated in the rectifier 80, producing corresponding (60-cycle) fluctuations in the direct current component of the rectified current in the resistor 81. The demodulated power fluctuations (60-cycle currents) are amplified in the alternating current amplifier 82 and impressed upon the phase sensitive detector 83 along with low frequency (60-cycle) current from the source 85 impressed upon the detector 83 through the transformer winding 84. The amplitude of the low frequency current from the amplifier 82 varies with power output of the magnetron, becoming less as the power output approaches a maximum value and changing to the opposite phase when the power output passes through the maximum value. The amplitude of the low frequency current from the winding 84 is constant. The phase sensitive detector performs the same function as the rectifier triode 21 in the system of Fig. 1, giving a direct current output which varies with the phase of the output of the amplifier 82 and the amount of the departure of the power output of the magnetron from its maximum value. The rectified current output of the detector 83 is impressed upon the control resistor 76 producing therein a potential drop which is impressed between the anode and cathode of the magnetron in such polarity that any change in the power output of the magnetron is counteracted and the power output is controlled to maintain it at maximum value at all times.

What is claimed is:

1. A space discharge device having a control electrode, the power output of which space discharge device goes through a maximum value at an intermediate value in an extended range of potential upon said control electrode, a phase sensitive detector having an output circuit connected to said control electrode, a source of variable potential, means to impress a potential from said source upon said control electrode, means connected to said space discharge device for generating a potential that varies in accordance with power fluctuations in the output of said space discharge device, and means for superposing in the said phase sensitive detector upon the potential from said source of variable potential the said potential which varies in accordance with power fluctuations of the said space discharge device in the particular phase relationship required to increase the power output of the said space discharge device.

2. A space discharge device having a control electrode upon which a variable potential causes the power output of the device to vary with a maximum power output within the given range of variation of the potential, a source of variable potential connected to said control electrode to produce fluctuations in the power output of the device, means to detect the power fluctuations produced by said variable potential, a phase sensitive detector for combining a potential from said source of variable potential with the detected power fluctuations of said space discharge device to produce a detector output potential, and means to impress said detector output potential upon said control electrode in proper polarity to increase the power output of the space discharge device.

3. An oscillator of a type the power output of which goes through a maximum value at an intermediate value of the potential impressed upon a control electrode of the oscillator, a rectifying device, a source of potential variations, means to impress potential variations from said source upon said control electrode and upon said rectifying device, means to impress a unidirectional potential from said rectifying device upon said control electrode, means connected to said oscillator for generating a potential variation which follows power variations in the output of said oscillator, and means for superposing in said rectifying device the said last-mentioned potential variation upon the said first-mentioned potential variation in the particular phase relationship required to increase the power output of said oscillator.

4. A reflex oscillator comprising a cavity resonator, a cathode, and a repeller electrode, a source of relatively low frequency oscillations, a phase sensitive detector, means connecting said low frequency source to said repeller electrode and to said phase sensitive detector, means to generate a potential which follows the low frequency fluctuations in the power output of said reflex oscillator due to the low frequency oscillations impressed upon said repeller electrode, means to impress said low frequency potential upon said phase sensitive detector along with said low frequency oscillations to produce a potential in the output of said phase sensitive detector, and means to impress said last-mentioned potential upon said repeller electrode in proper polarity to increase the power output of the reflex oscillator.

5. A reflex oscillator having a cathode, an anode consisting of a cavity resonator, and a repeller, a source of relatively low frequency oscillations, a detector having an anode, a cathode and a grid, means to bias said detector normally to cut-off, said low frequency source being connected to the anode of said detector and to the repeller of said reflex oscillator, a resistor connected between said cavity resonator and the cathode of said reflex oscillator, a low frequency amplifier connected between said resistor and the grid and cathode of said detector, a cathode resistor in circuit between the cathode and grid of said detector, means to impress a potential from said cathode resistor upon the said repeller in such phase as to increase the current through the said resistor connecting the said cavity resonator to the cathode of the reflex oscillator.

STEWART E. MILLER.

REFERENCES CITED

The following references are of record in the file of this patent:

UNITED STATES PATENTS

| Number | Name | Date |
|---|---|---|
| 2,404,568 | Dow | July 23, 1946 |
| 2,406,850 | Pierce | Sept. 3, 1946 |